(12) United States Patent
Kim

(10) Patent No.: US 8,564,549 B2
(45) Date of Patent: Oct. 22, 2013

(54) MOBILE TERMINAL AND METHOD OF CONTROLLING THE SAME

(75) Inventor: Jong Hwan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 12/508,965

(22) Filed: Jul. 24, 2009

(65) Prior Publication Data

US 2010/0105428 A1    Apr. 29, 2010

(30) Foreign Application Priority Data

Oct. 24, 2008   (KR) .................... 10-2008-0104756

(51) Int. Cl.
*G06F 3/041* (2006.01)

(52) U.S. Cl.
USPC ............ 345/173; 345/156; 345/169; 345/2.2; 345/1.2; 455/556.1; 455/557; 455/414.1

(58) Field of Classification Search
USPC .......................... 345/1.1–2.3, 169, 32, 7, 203; 455/556.1–556.2, 566; 348/744
See application file for complete search history.

(56) References Cited

U.S. PATENT DOCUMENTS

| | | | |
|---|---|---|---|
| 6,215,479 B1 * | 4/2001 | Matsui ........................... | 345/173 |
| 2004/0150627 A1 * | 8/2004 | Luman et al. ................. | 345/173 |
| 2006/0146015 A1 | 7/2006 | Buchmann | |
| 2006/0161871 A1 * | 7/2006 | Hotelling et al. ............. | 715/863 |
| 2006/0238637 A1 | 10/2006 | Goto et al. | |
| 2006/0248447 A1 * | 11/2006 | Makkonen ..................... | 715/513 |
| 2007/0265717 A1 * | 11/2007 | Chang ............................ | 700/83 |
| 2008/0012827 A1 * | 1/2008 | Ryu et al. ...................... | 345/158 |
| 2008/0163090 A1 * | 7/2008 | Cortright ....................... | 715/771 |
| 2008/0165149 A1 * | 7/2008 | Platzer et al. .................. | 345/173 |
| 2009/0322690 A1 * | 12/2009 | Hiltunen et al. .............. | 345/173 |

FOREIGN PATENT DOCUMENTS

| | | |
|---|---|---|
| EP | 1396981 | 3/2004 |
| EP | 2178274 | 4/2010 |
| EP | 2178282 | 4/2010 |

OTHER PUBLICATIONS

The State Intellectual Property Office of the People's Republic of China Application Serial No. 200910205397.7, Decision of Rejection dated Jul. 10, 2013, 5 pages.

* cited by examiner

*Primary Examiner* — Marcos Batista
*Assistant Examiner* — Keith Fang
(74) *Attorney, Agent, or Firm* — Lee, Hong, Degerman, Kang & Waimey

(57) ABSTRACT

A mobile terminal includes a display configured to display content, a projector configured to project at least a portion of the content onto a display surface which is externally located relative to the mobile terminal, and a control unit configured to detect user input to the mobile terminal, the user input causing the projector to project a cursor onto the display surface along with the projected content.

20 Claims, 17 Drawing Sheets

(11-1)  (11-2)

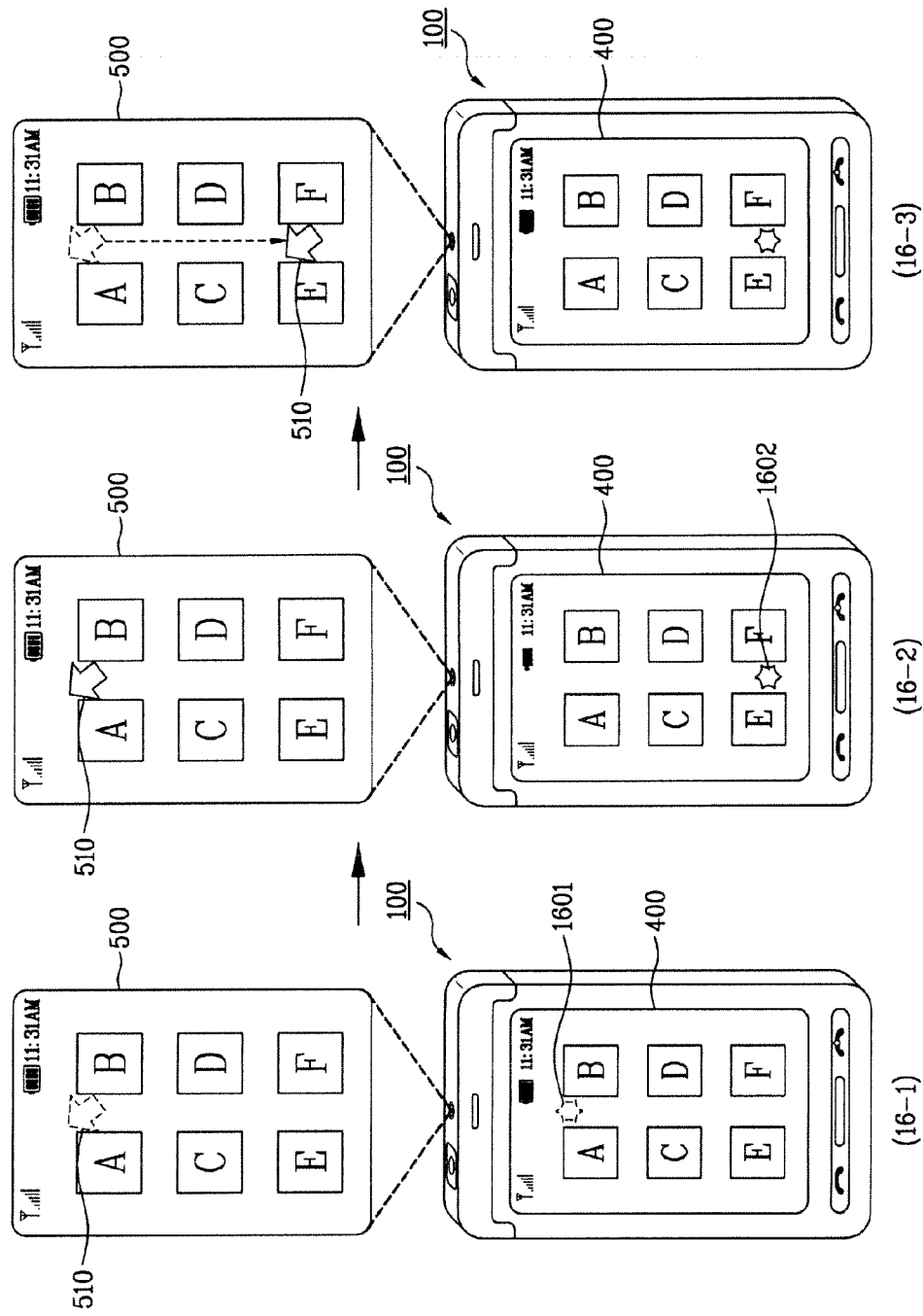

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2008-0104756, filed on Oct. 24, 2008, the contents of which are hereby incorporated by reference herein in their entirety.

FIELD OF THE INVENTION

The present invention relates to a mobile terminal, specifically, to a mobile terminal and method of controlling the same.

DISCUSSION OF THE RELATED ART

A mobile terminal is a device which may be configured to perform various functions. Examples of such functions include data and voice communications, capturing images and video, recording audio, outputting music, and displaying images and video. Some terminals include additional functionality which supports game playing, while other terminals are configured as multimedia players. More recently, mobile terminals have been configured to receive broadcast and multicast signals which permit viewing of content, such as videos and television programs.

Generally, terminals may be classified into mobile terminals and stationary terminals according to the mobility of the terminal. Furthermore, the mobile terminals may be further classified into handheld terminals and vehicle mounted terminals according to various factors, such as shape and size.

There are ongoing efforts to support and increase the functionality of mobile terminals. These efforts include improvements towards the software and hardware, as well as changes and improvements in the structural components which form the mobile terminal.

Various menus are associated with the functions of a terminal. However, due to the limited size of a display unit provided to the terminal the various functions and menus may become cumbersome and difficult to use.

SUMMARY OF THE INVENTION

According to one embodiment of the present invention, a mobile terminal is presented. The mobile terminal includes a display configured to display content, a projector configured to project at least a portion of the content onto a display surface which is externally located relative to the mobile terminal, and a control unit configured to detect user input to the mobile terminal, the user input causing the projector to project a cursor onto the display surface along with the projected content.

According to one feature, the cursor is only projected onto the display surface such that it is not displayed on the display of the mobile terminal. Additionally, the cursor is movable over portions of the display surface responsive to the user input.

According to another feature, the mobile terminal also includes a first sensor configured to detect a proximity-touch relative to the mobile terminal, a second sensor configured to detect a contact-touch relative to the mobile terminal, and if the proximity touch is detected by the first sensor, the control unit is further configured to cause positioning of the cursor on the display surface in a manner that corresponds to a location at which the proximity touch is detected by the first sensor. Additionally, if the contact-touch is detected by the second sensor, the control unit is further configured to control an object displayed on the display in a manner that corresponds to a location at which the contract-touch is detected by the second sensor.

According to yet another feature, if the detected proximity touch comprises a dragging, the control unit is further configured to cause movement of the cursor that corresponds to a direction of the dragging of the detected proximity touch, and if the contract-touch comprises a dragging, the control unit is further configured to cause scrolling of the display in a direction which corresponds to a direction of the dragging of the detected contact-touch.

According to still yet another feature, the first sensor comprises a proximity sensor and the second sensor comprises a contact sensor. Furthermore, the mobile terminal also includes a plurality of keys individually corresponding to one of a plurality of regions of the content that is projected onto the display surface, and the control unit is further configured to project the cursor within a particular one of the plurality of regions of the content responsive to user input to a corresponding one of the plurality of keys.

According to another feature, the control unit is further configured to cause the projector to project a semi-transparent overlay onto the display surface, wherein the overlay generally corresponds to the plurality of regions of the content.

According to yet another feature, the control unit is further configured to cause the projector to project guidelines onto the display surface, wherein the guidelines generally correspond to the plurality of regions of the content.

According to still yet another feature, if no user input is detected for a threshold period of time, the control unit is further configured to cause the projector to terminate projecting the cursor onto the display surface. Additionally, if further user input is detected after the threshold period of time, the control unit is further configured to cause the projector to again project the cursor onto the display surface at a location that generally corresponds to a location that the cursor was projected onto the display surface that was prior to the threshold period of time. Finally, the display comprises a touchscreen.

According to another feature, the mobile terminal also includes a navigation key comprising a plurality of directional keys, wherein the control unit is further configured to cause the projector to project the cursor onto the display surface at a location which generally corresponds to a direction of a selected one of the plurality of directional keys.

According to another embodiment, a method of controlling a mobile terminal is presented. The method includes displaying content on a display physically coupled to the mobile terminal, projecting at least a portion of the content onto a display surface which is externally located relative to the mobile terminal, and projecting a cursor onto the display surface along with the projected content responsive to user input received at the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIGS. 7 to 16 are diagrams of first and second displays for implementing a method of controlling a mobile terminal according to various embodiments of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes "module", "unit" and "part" are used for elements in order to facilitate the disclosure only. Therefore, significant meanings or roles are not given to the suffixes themselves and it is understood that the "module", "unit" and "part" can be used together or interchangeably.

Figure 1:
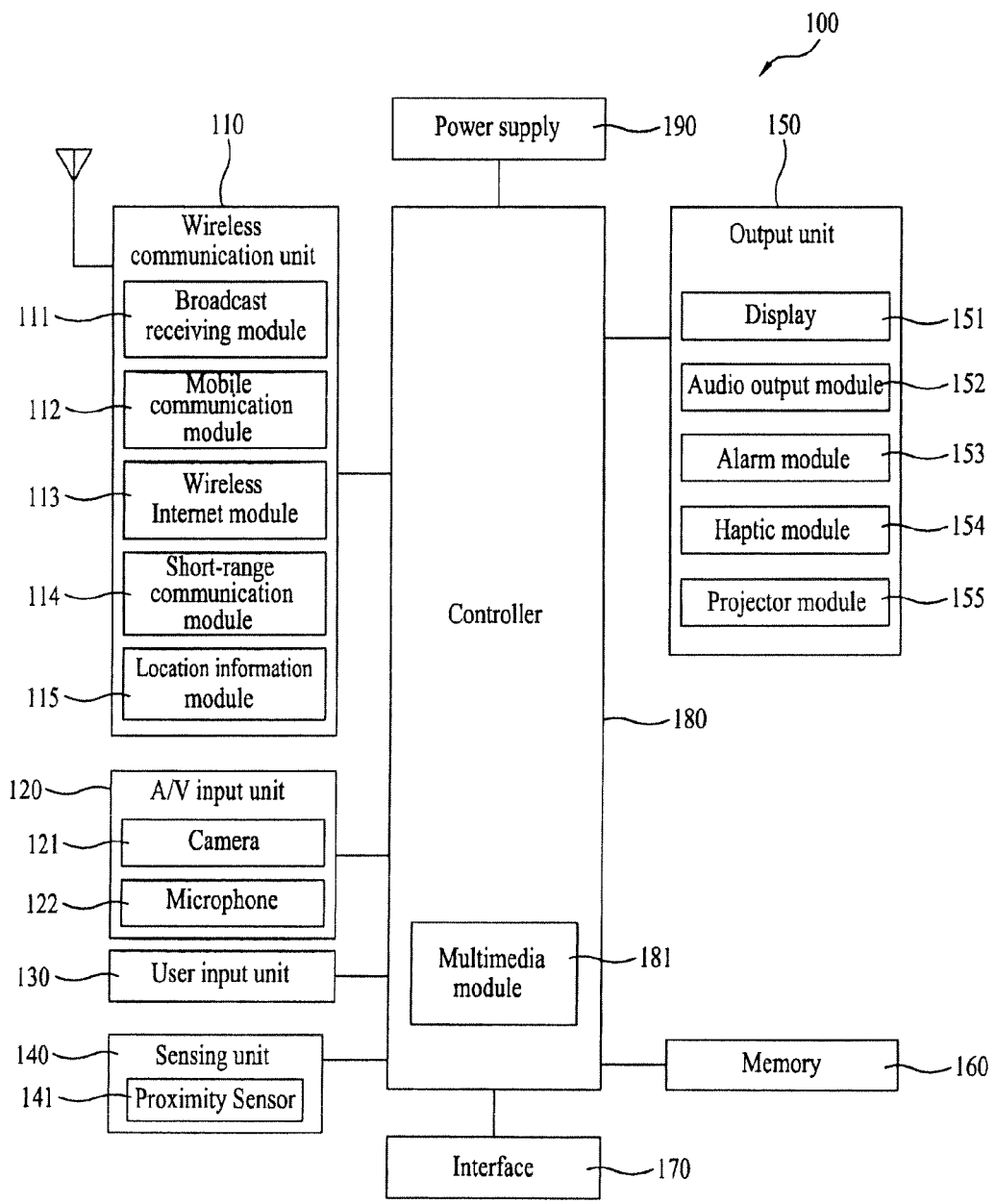
FIG. 1 is a block diagram of a mobile terminal in accordance with an embodiment of the present invention.

FIG. 1 is a block diagram of a mobile terminal 100 in accordance with an embodiment of the present invention. The mobile terminal 100 may be implemented using any of a variety of different types of terminals. Examples of such terminals include mobile phones, user equipment, smart phones, computers, digital broadcast terminals, personal digital assistants (PDAs), portable multimedia players (PMP), and navigators.

By way of non-limiting example and for convenience and conciseness of the following description, further description will be made with reference to a mobile terminal. It is not intended to limit the scope of the disclosed embodiments. The teachings of the present disclosure apply equally to other types of terminals.

FIG. 1 shows the mobile terminal 100 having various components, but it is understood that implementing all of the illustrated components is not a requirement. Greater or fewer components may alternatively be implemented. For example, the mobile terminal 100 may be configured with a wireless communication unit 110, an Audio/Video (A/V) input unit 120, a user input unit 130, a sensing unit 140, an output unit 150, a memory 160, an interface 170, a controller 180, and a power supply 190.

The wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wired communication unit. The wireless communication unit 110 and wired communication unit may be commonly referred to as a communication unit.

A broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

The mobile terminal 100 may include more than one broadcast receiving module 111 for simultaneous reception of at least two broadcast channels.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module may also receive multicast signals. Data received by the broadcast receiving module 111 may be stored in a suitable device, such as a memory 160. The broadcast associated information may be provided via a mobile communication network, and received by the mobile communication module 112.

The mobile communication module 112 transmits and receives wireless signals to and from one or more network entities, such as a base station or a Node-B. The wireless signals may represent audio, video, multimedia, control signaling, data, and the like.

The wireless Internet module 113 provides Internet access for the terminal. The wireless Internet module 113 may be internally or externally coupled to the terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

The short-range communication module 114 facilitates short-range communications. Suitable technologies for implementing this module include radio frequency identification (RFID), infrared data association (IrDA), ultra-wideband (UWB), as well as the networking technologies commonly referred to as Bluetooth™ and ZigBee™.

The location information module 115 identifies and obtains the location of the mobile terminal 100. The location information module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera 121 receives and processes image frames of still pictures or video. Two or more cameras 121 may be provided according to the configuration of the mobile terminal.

The microphone 122 receives an external audio signal while the portable device is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and closed state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired or wireless headphones, external chargers, power supplies, storage devices configured to store data, or microphones. The interface unit 170 may be configured using a wired and wireless data port, audio input/output (I/O) ports, or video (I/O) ports. The interface unit 170 may also include a card socket for connecting various cards, such as a memory card, a subscriber identity module (SIM) card, a user identity module (UIM) card, or a replaceable user identity module (RUIM) card.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device.

In addition, the display 151 may include a proximity sensor 141 for sensing an approach of the pointing means and a touch sensor for sensing a touch by the pointing means. Specifically, the display 151 may be implemented with the sensing unit 140 capable of sensing the approach and touch by the pointing means.

The proximity sensor 141 may detect and output a distance between the pointing means and the sensor according to the capacitance which varies in response to a proximity distance of the pointing means. The proximity sensor 141 may also output proximate location information of the pointing means, although proximity sensor 141 has been described as a capacitance type proximity sensor, various types of proximity sensors may also be used.

The display 151 may be implemented using known display technologies such as a liquid crystal display (LCD), a thin film transistor-liquid crystal display (TFT-LCD), an organic light-emitting diode display (OLED), a flexible display, or a three-dimensional display.

Some of the above displays can be configured transparent so that an external environment can be seen through the corresponding display. Such a display can be called a transparent display. As a representative example for the transparent display, there is a transparent LCD display or the like.

The terminal 100 may include one or more of such displays. An example of a two-display embodiment is one in which one display 151 is configured as an internal display which is viewable when the terminal is in an opened position and a second display 151 configured as an external display which is viewable in both the open and closed positions.

The touchscreen can be configured to detect a touch input pressure as well as a touch input position and size.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio related to a particular function, such as a call notification, a message notification, or an error notification.

The output unit 150 is further illustrated having an alarm module 153, which may be used to identify the occurrence of an event associated with the mobile terminal 100. An example of such output includes providing a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

The output unit 150 may further include a haptic module 154 and a projector module 155.

The haptic module 154 generates various tactile effects that may be sensed by a user. For example, a vibration may be generated by the haptic module 154 as a tactile effect. The strength and pattern of the vibration generated by the haptic module 154 are adjustable. For example, different vibrations can be output as being synthesized together or can be output in sequence. More than one haptic module 154 may be provided to the mobile terminal 100.

The projector module 155 performs an image projection function. The projector module 155 may display an image, which is identical to or partially different from the image displayed on the display unit 151, on an external surface according to a control signal of the controller 180.

Specifically, the projector module 155 may include a light source (not shown) for generating light, such as a laser, for projecting an image, an image producing means (not shown) for producing an image to output using the light generated from the light source, and a lens (not shown) for enlarging the output image externally in a predetermined focus distance. Additionally, the projector module 155 may further include a device (not shown) for adjusting direction of a projected image by moving the lens or the entire module.

The projector module 155 can be a CRT (cathode ray tube) module, an LCD (liquid crystal display) module, a DLP (digital light processing) module. Specifically, the DLP module may be operated by enabling the light generated from the light source to reflect on a DMD (digital micro-mirror device) chip and may be advantageous for reducing the size of the projector module 155.

It is understood that the projector module 155 can be provided to any portion of the mobile terminal 100 according to the necessity thereof.

A memory 160 may store various types of data to support the processing, control, and storage requirements of the mobile terminal 100. Examples of such data include program instructions for applications operating on the mobile terminal 100, contact data, phonebook data, messages, pictures, and video.

Additionally, data for various patterns of vibration and sound output in response to a touch input on the touchscreen may be stored in the memory 160.

The memory 160 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

The controller may include a multimedia module 181 which provides multimedia playback. The multimedia module 181 may be configured as part of the controller 180 or may be implemented as a separate component.

Moreover, the controller 180 may perform a pattern recognition process for recognizing an input performed on the touchscreen as characters or images, respectively.

The controller 180 may perform a TTS (text to speech) conversion for converting text to speech or an STT (speech to text) conversion for converting speech to text.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by a controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The mobile terminal 100 may be implemented in a variety of different configurations. Examples of such configurations include folder-type, slide-type, bar-type, rotational-type, and swing-type.

For clarity, further disclosure will primarily relate to a slide-type mobile terminal 100. However such teachings apply equally to other types of mobile terminals 100.

Figure 2:
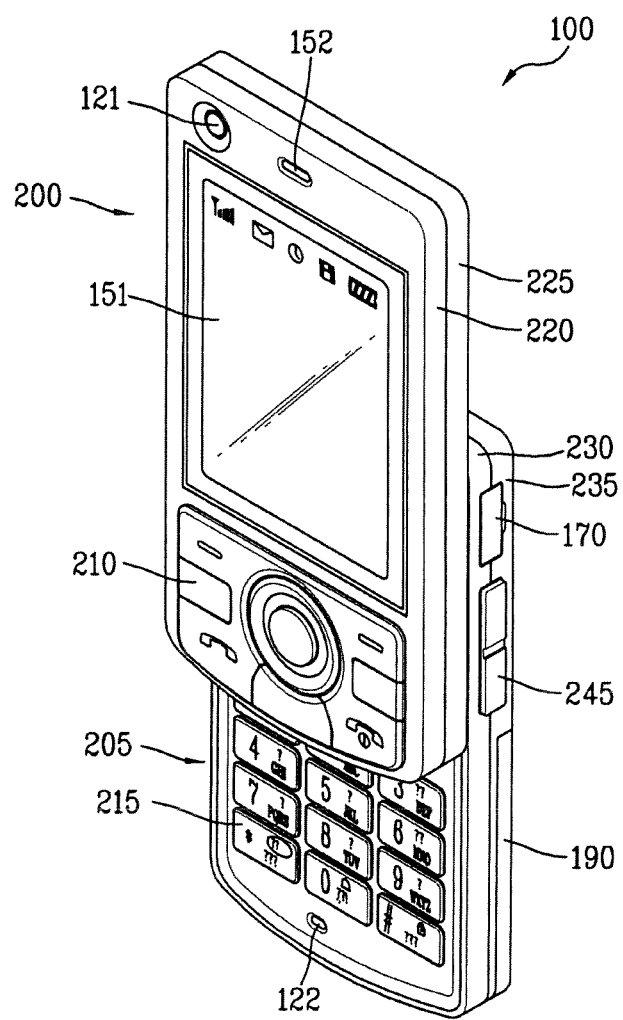
FIG. 2 is a diagram of a front side of a mobile terminal according to an embodiment of the present invention.

FIG. 2 is a perspective view of a front side of a mobile terminal 100 according to an embodiment of the present invention. As illustrated in FIG. 2, the mobile terminal 100 is shown having a first body 200 configured to slidably cooperate with a second body 205.

The user input unit 130 illustrated in FIG. 1 may include a first input unit such as function keys and four directional keys 210, such as a navigation key, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 is positioned over the second body 205 in the closed position such that the keypad 215 is substantially or completely obscured by the first body. The user may access the keypad 215, the display 151, and function keys 210 in the open position. The function keys 210 may be configured for a user to enter commands such as "start", "stop", or "scroll".

The mobile terminal 100 is operable in either a standby mode or an active call mode. Typically, the terminal 100 functions in the standby mode when in the closed position and in the active mode when in the open position. The mode configuration may be changed as required or desired by the user.

The first body 200 is formed from a first case 220 and a second case 225, and the second body 205 is formed from a first case 230 and a second case 235. The respective first and second cases may be formed from a suitably rigid material, such as injection molded plastic, or formed using metallic material, such as stainless steel (STS) and titanium (Ti).

One or more intermediate cases may be provided between the first case 220 and second case 225 of the first body 200, or between the first case 230 and second case 235 of the second body 205. The first body 200 and the second body 205 may be sized to house electronic components necessary to support operation of the mobile terminal 100.

The first body 200 is illustrated having a camera 121 and audio output module 152. The camera 121 may be selectively positioned such that the camera may rotate or swivel relative to the first body 200.

The function keys 210 are positioned adjacent to a lower side of the display 151. The display 151 is implemented as an LCD. The display 151 may also be configured as a touchscreen having an underlying touchpad which generates signals responsive to user contact with the touchscreen.

The second body 205 is illustrated having a microphone 122 positioned adjacent to the keypad 215 and side keys 245 positioned along the side. The side keys 245 may be configured as hot keys, such that the side keys are associated with a particular function of the terminal 100.

An interface unit 170 is positioned adjacent to the side keys 245. A power supply 190 in a form of a battery is located on a lower portion of the second body 205. The interface 170 may be used as a link for which the mobile terminal may exchange data with an external device. For example, the interface 170 may be implemented as at least one of a connection port for connecting an earphone to the mobile terminal via a wired or wireless means, a port for short-range communications, such as an Infrared Data Association (IrDA) port, a Bluetooth™ port, or a wireless LAN port, or a power supply port for providing power to the mobile terminal.

Figure 3:
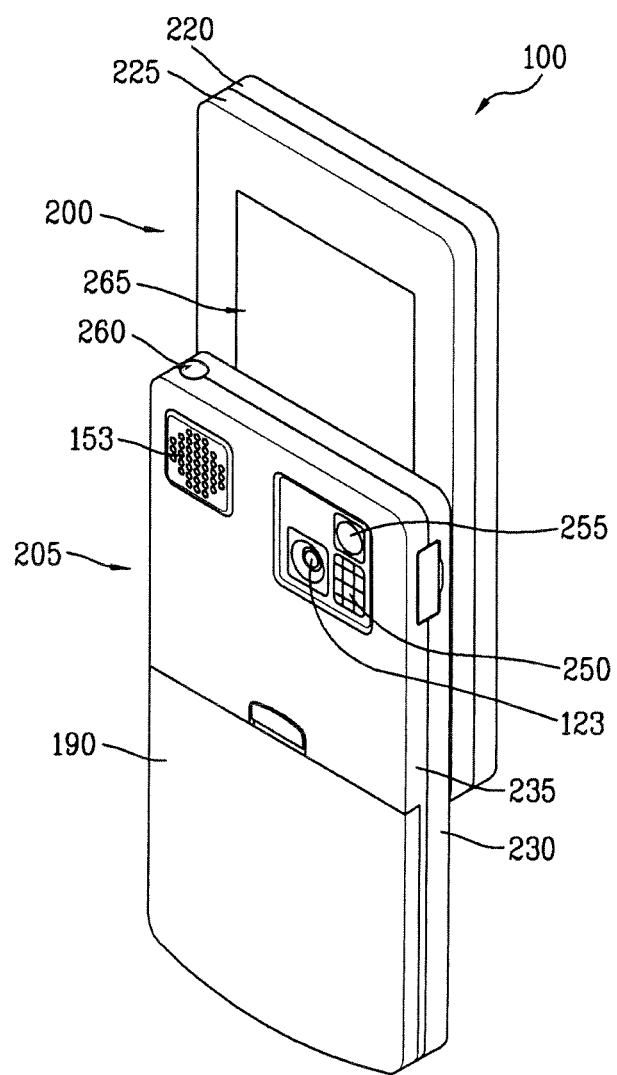
FIG. 3 is a diagram of a backside of the mobile terminal shown in FIG. 2.

FIG. 3 is a rear view of the mobile terminal 100 shown in FIG. 2. As illustrated in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body. The audio output module 152 of the first body 200 and the audio output module 153 of second body 205 may cooperate to provide stereo output. Moreover, either or both of the audio output modules 152 and 153 may be configured to operate as a speakerphone.

A broadcast signal receiving antenna 260 is illustrated located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slideably couples with a corresponding slide module (not illustrated) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those illustrated by the representative figures.

In the following description, a configuration for providing the aforementioned projector module to the slider type mobile terminal 100 is further explained with reference to FIG. 4A and FIG. 4B.

Figure 4A:
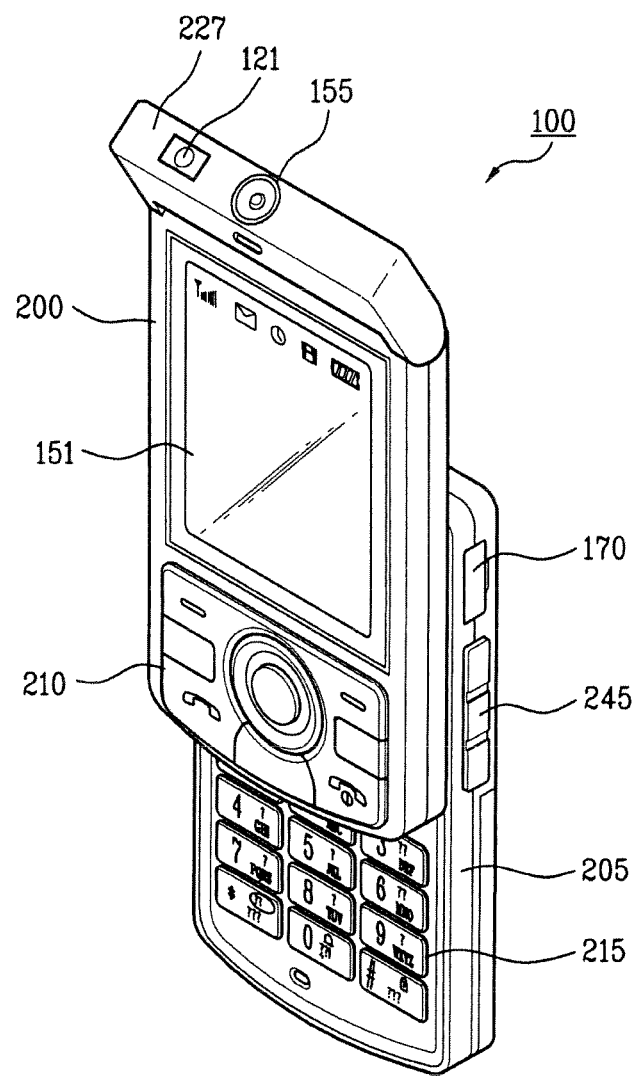
FIG. 4A and FIG. 4B are diagrams of a mobile terminal according to another embodiment of the present invention.
Figure 4B:
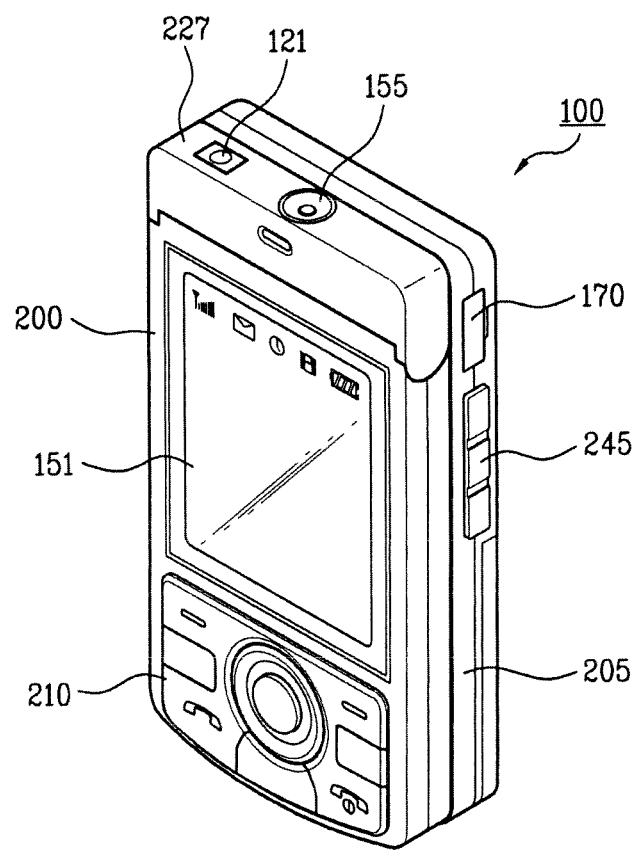

FIG. 4A and FIG. 4B are perspective diagrams of a mobile terminal according to another embodiment of the present invention.

Referring to FIG. 4A and FIG. 4B, a projector body 227 including a projector module 155 is rotatably assembled to a first body 200. As mentioned in the foregoing description, a second body 205 may be assembled to the first body 200.

Referring to FIG. 4A, the projector body 227 may be rotated while the second body 205 is in the open position. The projector body 227 may be hinged to the first body 200 and the angle of the projector body 227 may be adjusted while projecting an image via the projector 155. The camera 121 may be provided to the projector body 227 to photograph the image projected by the projector 155.

As illustrated in FIG. 4B, the projector body 227 returns to an un-adjusted position when the first and second bodies 200 and 205 shown in FIG. 4A return to the closed position.

Additionally, a rotation angle of the projector body 227 may be limited to only rotate in a direction towards the first body 200 in order to prevent interference between the first and second bodies 200 and 205.

The above-described projector module is applicable to the bar type mobile terminal as well. This is explained with reference to FIG. 5A and FIG. 5B as follows.

Figure 5A:
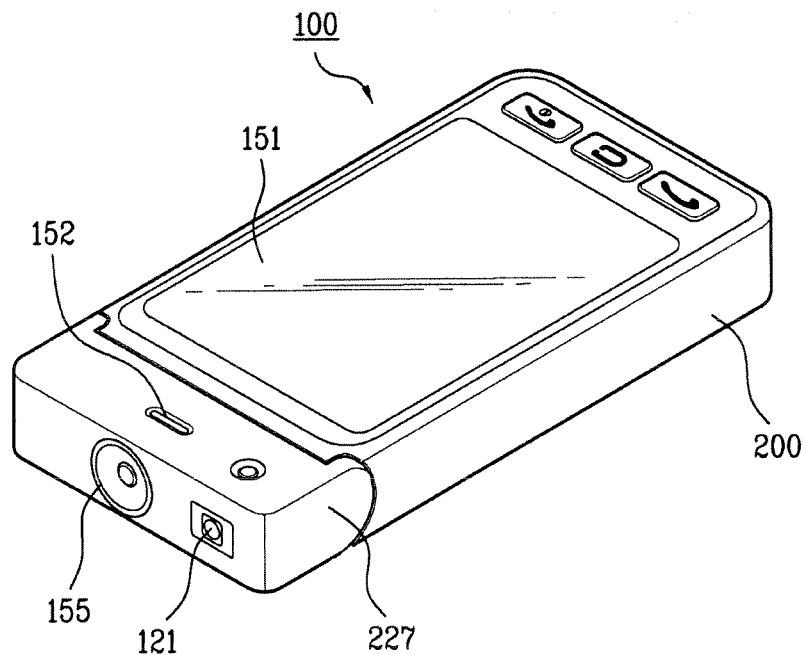
FIG. 5A and FIG. 5B are diagrams of a mobile terminal according to a further embodiment of the present invention.
Figure 5B:
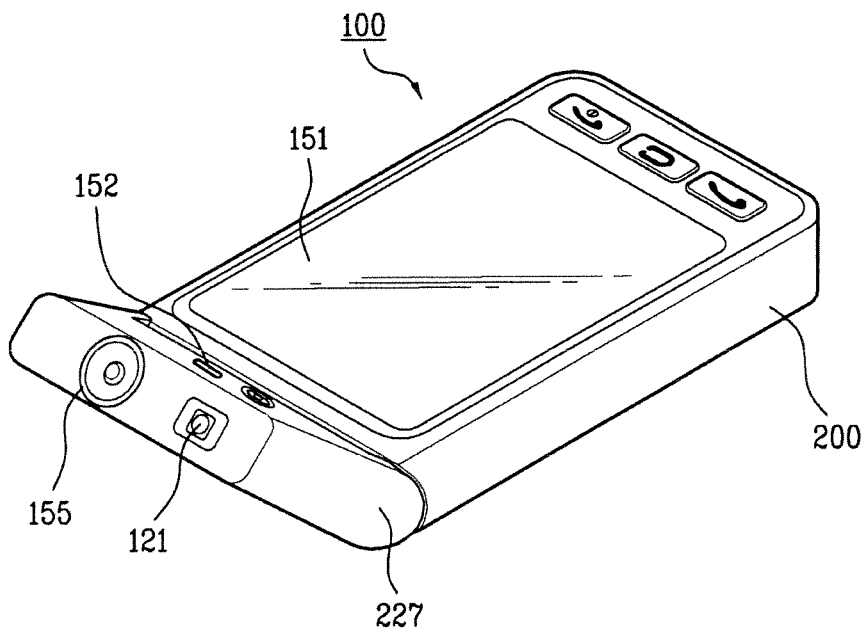

FIG. 5A and FIG. 5B are perspective diagrams of a mobile terminal according to another embodiment of the present invention. As illustrated in FIG. 5A and FIG. 5B, a projector body 227 may be rotatably assembled to a main body 200 of the mobile terminal.

Specifically, the projector body 227 can be hinged to the main body 200. A user may adjust a projection angle of the projector body 227 in order to more accurately project an image via the projector 155. Additionally, a camera 121 may be provided on the projector body 227 to photograph the image projected by the projector 155.

FIG. 5A illustrates an example of the mobile terminal before the projector body 227 is rotated. FIG. 5B illustrates an example of the mobile terminal after the projector body 227 has been rotated.

The mobile terminal 100 may operate in a communication system capable of transmitting data via frames or packets. The communication system may include wired communication, wireless communication, or a satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 6:
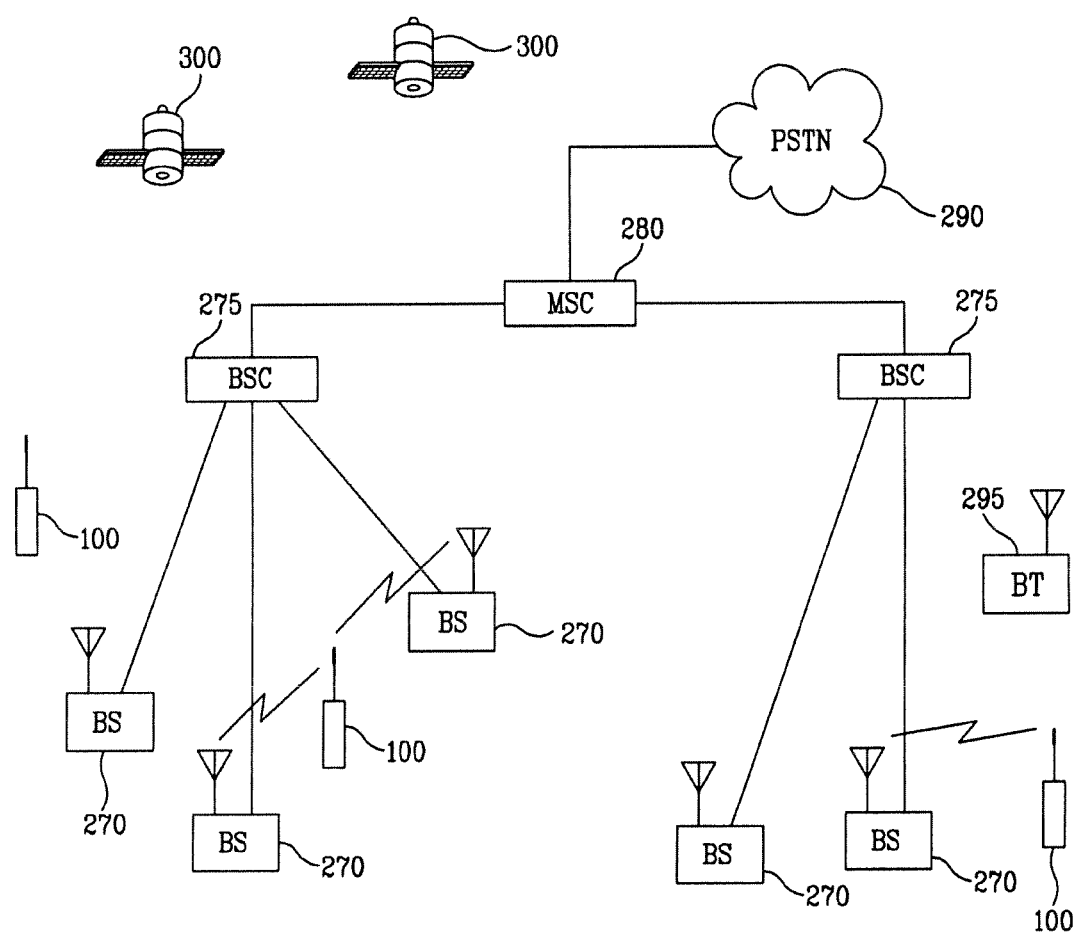
FIG. 6 is a block diagram for an example of a wireless communication system for a mobile terminal according to the present invention.

As illustrated in FIG. 6, a CDMA wireless communication system is illustrated having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is illustrated broadcasting to mobile terminals 100 operating within the system. The broadcast receiving module 111 of the mobile terminal 100 is configured to receive broadcast signals transmitted by the BT 295. Similar arrangements may be implemented for other types of broadcast and multicast signaling.

FIG. 6 also shows several global positioning system (GPS) satellites 300. The GPS satellites 300 facilitate locating the position of some or all of the terminals 100. The position-location module 115 of the mobile terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275. The BSC 275 provides call resource allocation and mobility management functionality including soft handoffs between base stations 270. The BSCs 275 also route the received data to the MSC 280, which provides additional routing services for interfacing with the PSTN 290. Similarly, the PSTN 290 interfaces with the MSC 280 and the MSC interfaces with the BSC 275, which in turn control the BSs 270 to transmit sets of forward-link signals to the terminals 100.

Hereinafter, a control method applicable to the above-configured mobile terminal 100 is explained with respect to various embodiments. It is understood that the following embodiments can be implemented independently or through combinations thereof.

In the following description, methods of controlling the above-configured mobile terminal according to embodiments of the present invention are explained. It is understood that the following embodiments can be implemented individually or in combination with each other.

The following embodiments can be further implemented if the display module 151 includes a touchscreen. In the following description, a screen display in the touchscreen 151 shall be named a first display 400 and a projection display projected by the projector module 155 shall be named a second display 500.

Meanwhile, a pointer may refer to a means, such as a stylus pen, or a finger, for touching the touchscreen. Additionally, the pointer may refer to an indicator having a specific shape, such as an arrow, or a sandglass, represented on a display and moving according to a manipulation of a mouse or a touchpad.

In order to distinguish the aforementioned definitions of the pointer, a means for touching a touchscreen shall be referred to as a "pointer" and an indicator having a specific shape moving according to a manipulation of a mouse, a touchpad, a touchscreen or the like shall be referred to as a "cursor". In this example, the cursor can include an indicator on a display to indicate a position enabling a user to input text.

FIGS. 7 to 16 are diagrams of first and second displays for implementing a method of controlling a mobile terminal according to one embodiment of the present invention.

Figure 7:
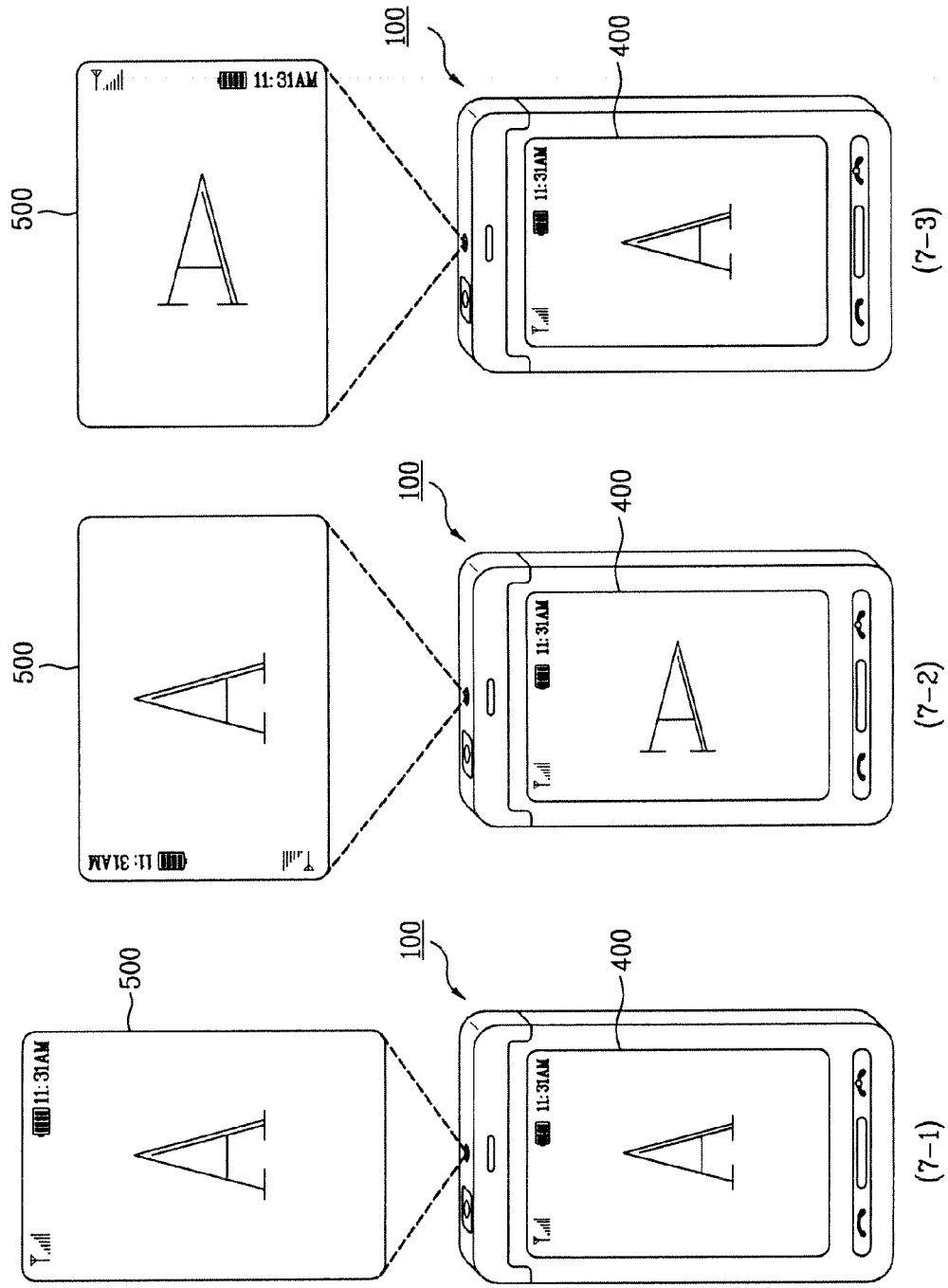

As illustrated in FIG. 7-1, the mobile terminal 100 displays a first display 400 in a top-to-bottom direction on the touchscreen 151 and may display a second display 500, which is projected on an external surface, such as a screen or a wall via the projector 155. The second display 500 may be in the same top-to-bottom direction as the first display 400.

Alternatively, the mobile terminal 100 may be configured to display the first and second displays in various directions in addition to the top-to-bottom direction illustrated in FIG. 7-1.

As illustrated in FIG. 7-2, the mobile terminal 100 may display a first display 400 in a right-to-left direction and may also display a second display 500 in a top-to-bottom direction. Although not shown in FIG. 7, the first display 400 may be displayed in a left-to-right direction such that the first display 400 of FIG. 7-1 is rotated 90 degrees counterclockwise. As illustrated in FIG. 7-3, the mobile terminal 100 may display a first display 400 in a top-to-bottom and may display a second display 500 in a right-to-left direction. Although not shown in FIG. 7, the second display 500 may be displayed in a left-to-right direction as if the second display 500 of FIG. 7-1 is rotated 90 degrees counterclockwise. Additionally, although now shown in FIG. 7, the mobile terminal 100 may display both the first and second displays 400 and 500 in the right-to-left or left-to-right direction. Furthermore, as illustrated in FIG. 7, the first and second displays display the same image. However, the present invention may also be configured to display a different image on the first and second displays. For example, although not shown, if a movie is displayed via the mobile terminal 100, a menu associated with the movie may be displayed on the first display 400 and the movie may be displayed on the second display 500.

The directions of the first and second displays 400 and 500 described above may be made via a user selection via the user input unit 130.

Figure 8:
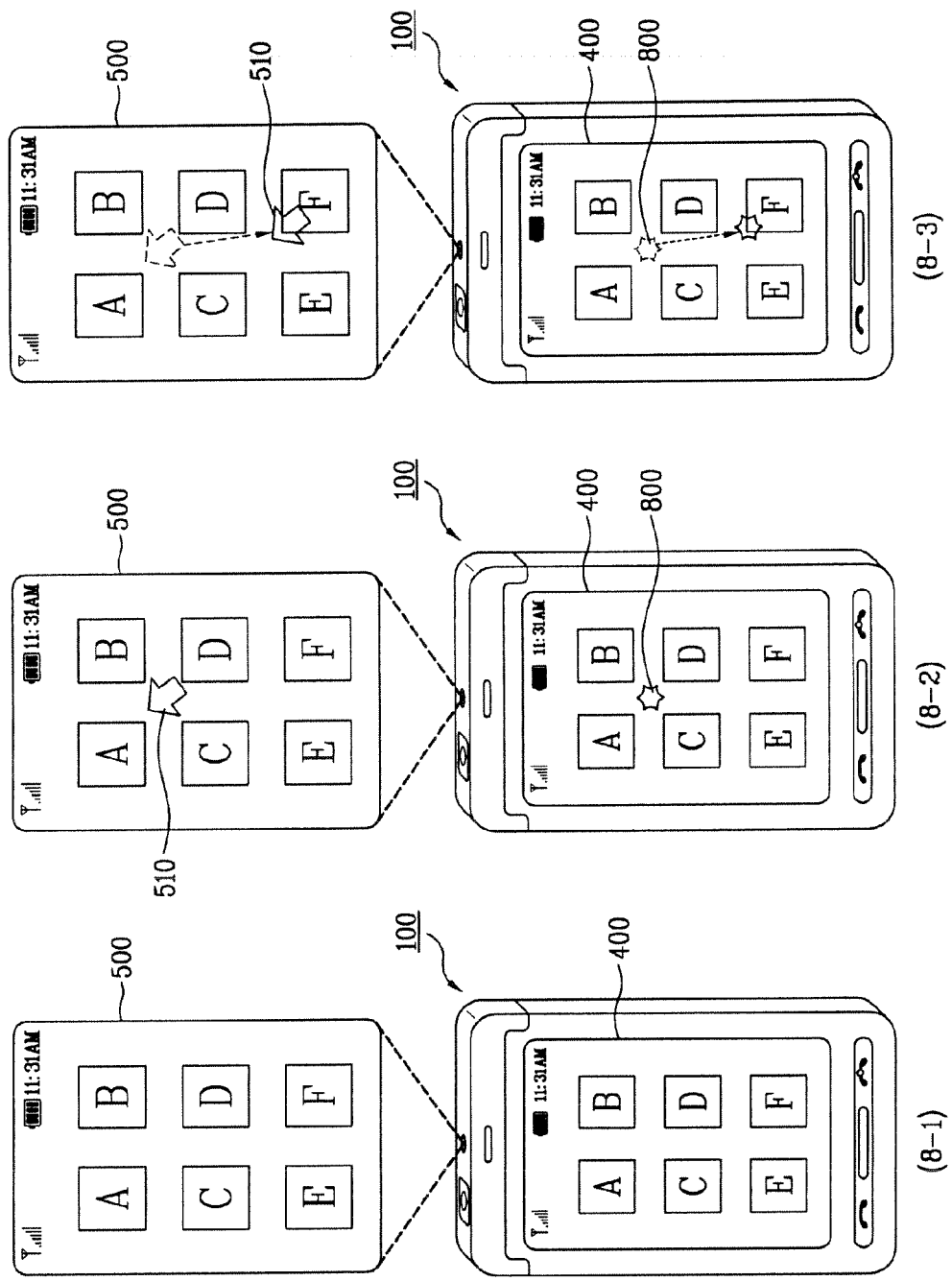

As illustrated in FIG. 8, a cursor may be displayed on at least one of the first display 400 and the second display 500. FIG. 8, illustrates an example where both of the first display 400 and the second display 500 display the same image. However, the depicted embodiment may alternatively be implemented such that the first display 400 and the second display 500 may display different images.

FIG. 8-1 illustrates a first display 400 displayed on the touchscreen 151 and a second display 500 displayed on the external surface. A plurality of objects (A-F) may be displayed on each of the first and second displays 400 and 500. The objects may include a menu icon, a phone number icon, and a multimedia icon.

As illustrated in FIG. 8-2, the first display 400 may be touched with a pointer 800. The mobile terminal 100 may generate a cursor 510 at a position on the second displays 500 in response to the pointer 800 touching the first display 400. The cursor 510 corresponds to the touched position on the touchscreen. In this example, the touch may be a proximity touch or a contact touch.

The cursor 510 is not limited to being generated in response to contact on the first display 400. For example, the cursor 510 may be generated in response to manipulation of the user input unit 130. Additionally, the cursor may be generated in response to the selection of a specific icon (not shown) displayed on the first display 400. The generation of the cursor 510 is not limited to the embodiments described above.

As illustrated in FIG. 8-3, the pointer 800 may be dragged on the touchscreen 151 and the mobile terminal 100 may generate a trace of the drag. The generated cursor 510 on the second display 500 is moved in accordance with the movement of the pointer 800. Additionally, the mobile terminal 100 may display a trace on the second display 500 which is similar to the trace displayed on the first display 400.

Subsequently, the mobile terminal 100 may terminate the display of the cursor 510 on the second display 500 when the touch is released from the first display 400. The embodiment shown is not limited to terminating the display of the cursor 510 when the touch is released form the first display 400. For example, the display of the cursor 510 may terminate in response to a user input via the user input unit 130 or the selection of a specific icon on the first display 400 (not shown). The method of terminating the display of the cursor is not limited to the embodiments described above.

Additionally, when a pointer 800 is touched to the touchscreen, the mobile terminal 100 may terminate the display of the cursor 510 if the pointer stops moving or after a predetermined time from when the pointer stops moving. Moreover, the mobile terminal 100 may re-display the cursor 510 if the pointer moves or after a predetermined time from when the pointer starts moving.

Furthermore, the shape, size, or color, of the cursor 510 may be adjusted via a menu on the mobile terminal 100. Adjusting the cursor is apparent to those skilled in the art and the details will be omitted for clarity of this disclosure.

As illustrated in FIG. 8, the cursor is moved via the touch on the first display 400. Still, as illustrated in FIG. 9, the cursor 510 may be moved via various methods, and is not limited to movement in response to a touch on a first display 400.

Figure 9:
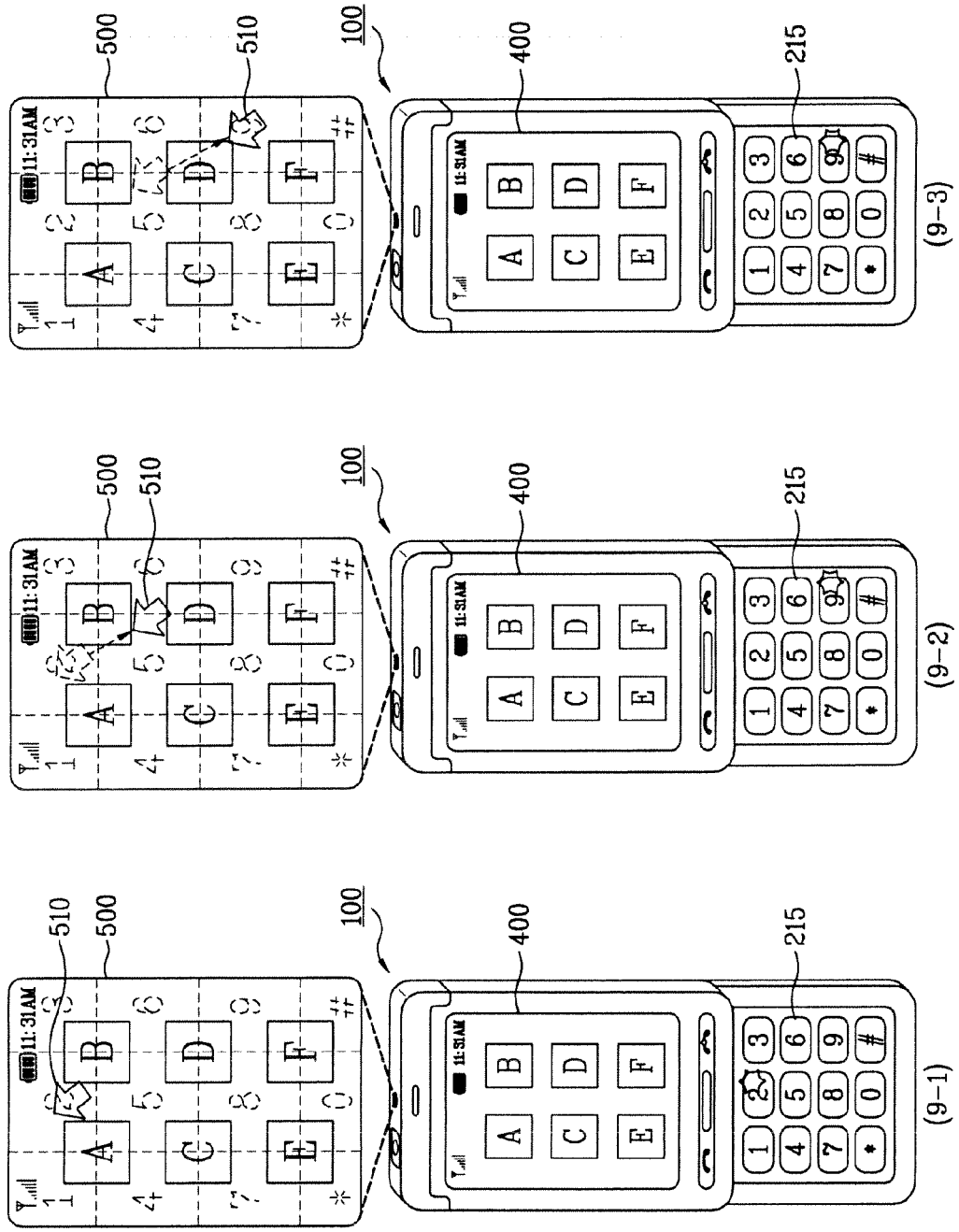

As illustrated in FIG. 9-1, a second display 500 may be divided into a plurality of regions. The plurality of the regions correspond to the respective key buttons of a keypad 215. For example, the plurality of the regions of the second display 500 have the same configuration as the plurality of the key buttons of the keypad 215 (FIG. 9-1). Although, as illustrated in FIG. 9-1, the second display 500 is visually divided into a plurality of the regions, another embodiment of the present invention may provide the plurality of regions on the second display 500 without visually distinguishing the regions.

A first key button, such as "2" may be selected from a plurality of the key buttons (FIG. 9-1). In response to selecting the first key button, the second display 500 may display a cursor 510 on a first region associated with key button "2". In this example, the cursor 510 may be generated within the boundaries of the first region. Preferably, the cursor 510 may be generated in the center of the first region.

The cursor generation is not limited to the embodiment disclosed above. For example, the cursor may be generated in response to user input on the user input unit 130 or the cursor may be generated in response to a selection of a specific icon (not shown) displayed on the first display unit 400.

As illustrated in FIG. 9-2, a second key button, such as "9", is selected from a plurality of the key buttons. The cursor 510 may gradually move toward a second region, "9", of the second display 500 associated with the second key button (FIGS. 9-2 and 9-3). Preferably, the cursor 51 0 moves toward a center of the second corresponding region. If the second button is released during the movement of the cursor 510, the cursor 510 may stop its movement at the position located at the timing point of releasing the selection of the second button.

In another embodiment, the cursor 510 may move from the first region, "2", to the second region, "9", when the second key button is selected.

Furthermore, the mobile terminal 100 may terminate the display of the cursor 510 when the second key button is released or after a predetermined time from the release of the second key button. Additionally, the display of the cursor 510 may be terminated in response to the selection of a specific key of the user input unit 130 or a specific icon (not shown) displayed on the first display unit 400. The method of terminating the display of the cursor 510 is not limited to the embodiments described above.

Figure 10:
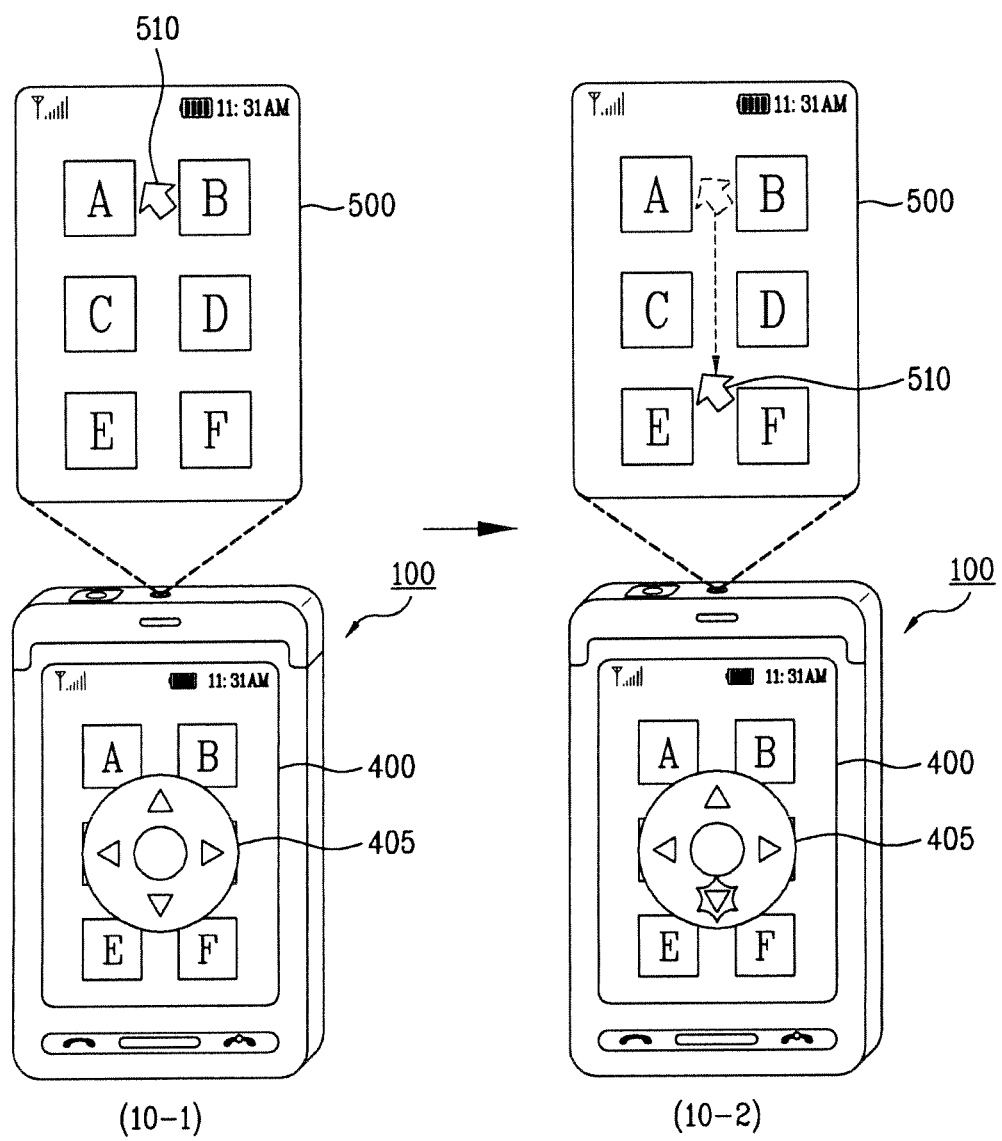

As illustrated in FIG. 10, the generated cursor may be moved via manipulation of the navigation key 405. FIG. 10-1 illustrates that the cursor 510 may be generated and displayed on a second display 500.

Additionally, as illustrated in FIG. 10-1, a virtual navigation key 405, may be displayed on a first display 400. In this example, the generation and termination of the virtual navigation key 405 may be achieved via a manipulation of a predetermined key or an icon (not shown). The virtual navigation key 405 may be replaced by the real navigation key if the mobile terminal 100 is provided with a real navigation key. Accordingly, the virtual navigation key 405 may not be displayed due to the presence of the real navigation key.

Furthermore, the user input unit 130 may be configured to perform the functionality associated with the virtual navigation key 405. Specifically, the up/down/right/left keys of the virtual navigation key 405 may be associated with predetermined key buttons, such as key buttons "2", "8", "4" and "6", of the user input unit 130. In this example, the virtual navigation key 405 may not be displayed due to the presence of the user input unit 130.

The cursor 510 may be displayed on the second display 500 when the virtual navigation key 405 is activated or after the up/down/right/left keys of the virtual navigation key 405 are associated with keys of the user input unit 130.

The mobile terminal 100 may terminate the display of the cursor 510 on the second display when the virtual navigation key 405 is deactivated or the association with the keys of the user input unit 130 is terminated.

As illustrated in FIG. 10-2, the cursor 510 moves in response to the direction of a key pressed in the virtual navigation key 405. This is apparent to those skilled in the art without detailed description, therefore the details will be omitted in the following description.

In the above description, the cursor is only displayed on the second display 500. Still, as illustrated in FIG. 11, the cursor is not limited to only being displayed on the second display 500.

Figure 11:
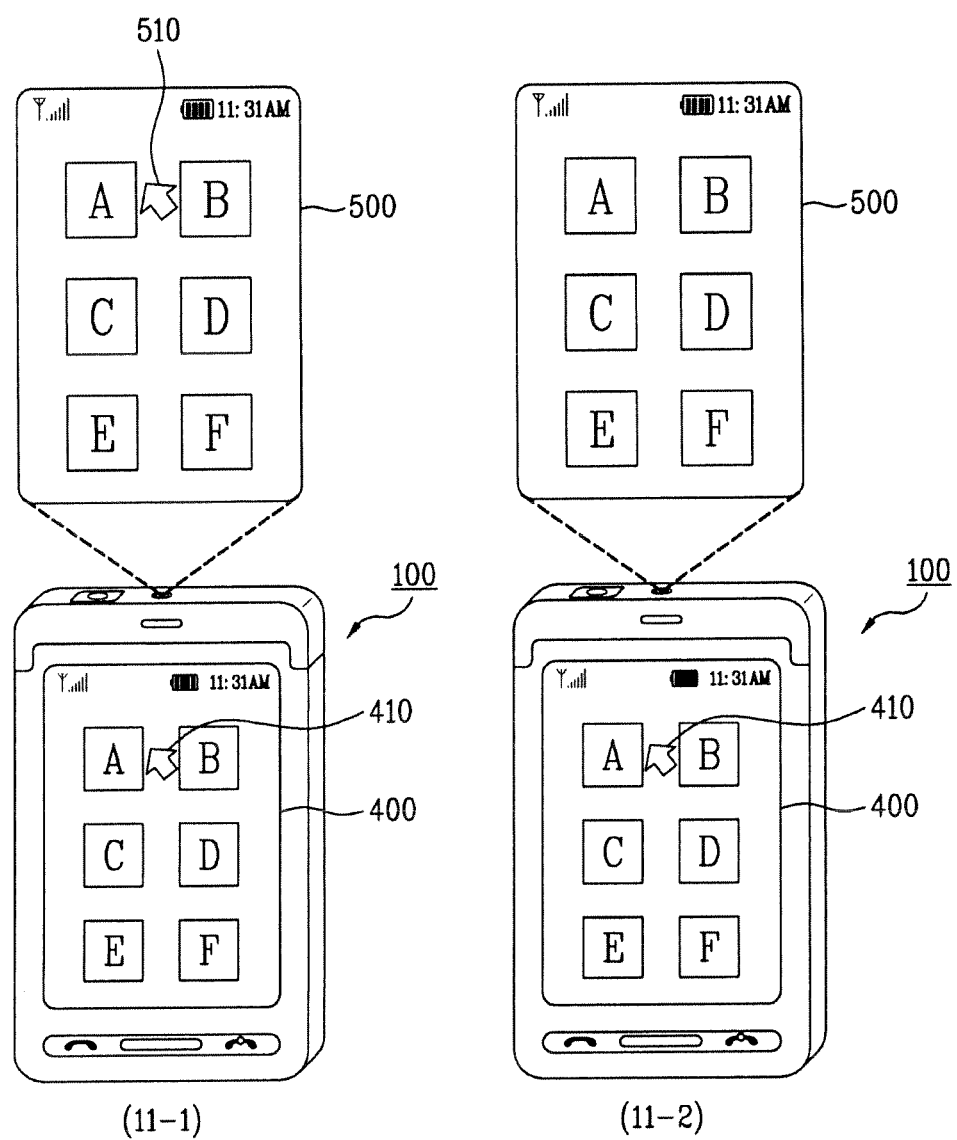

As illustrated in FIG. 11-1, the mobile terminal 100 may display a first icon 410 and a second icon 510, respectively, on a first display 400 and a second display 500. Furthermore, as illustrated in FIG. 11-2, the mobile terminal 100 may only display a first icon 410 on a first display 400.

Moving the cursor via a touch on the touch screen is explained in detail with reference to FIG. 12 and FIG. 13.

Figure 12:
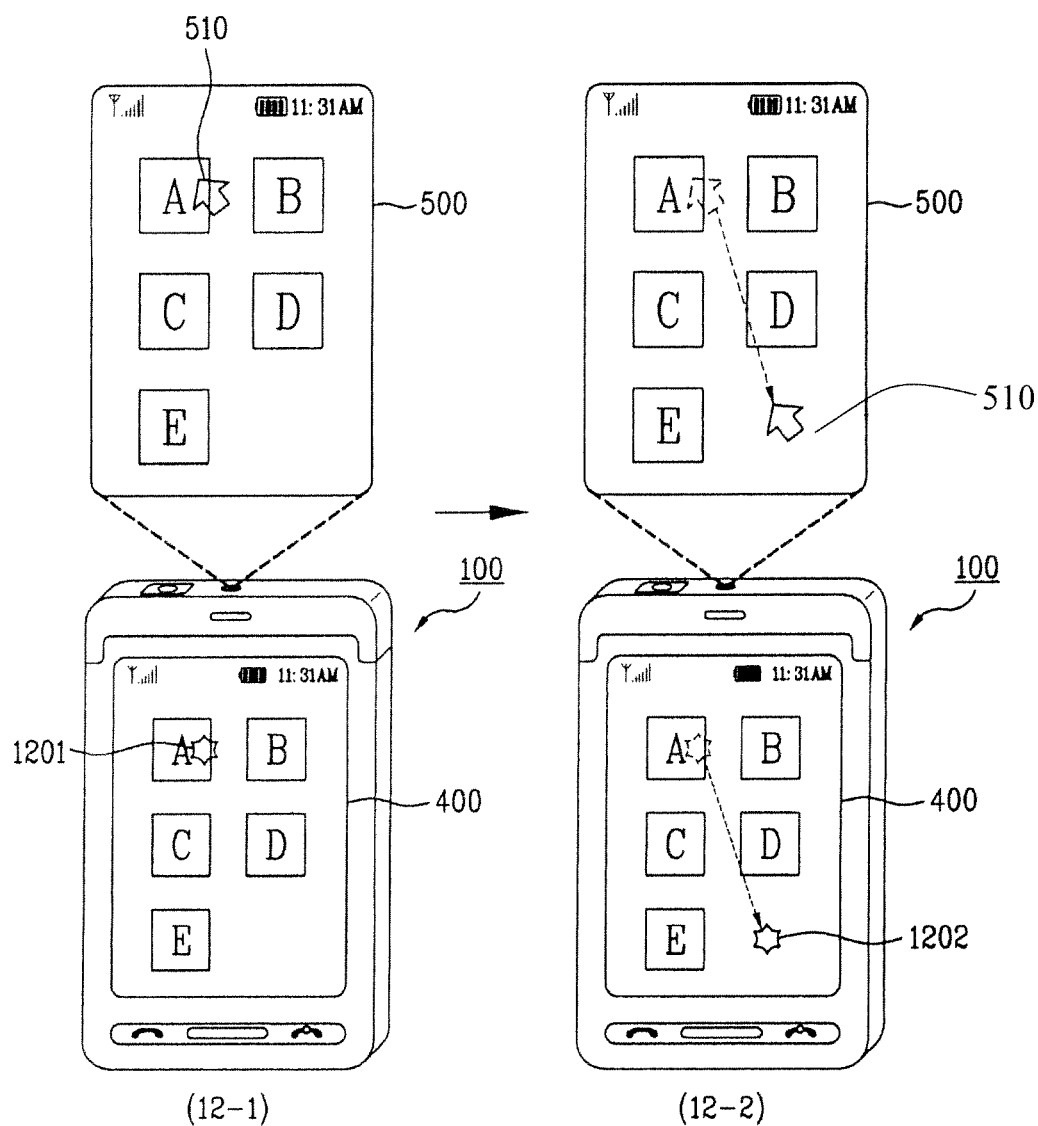

As illustrated in FIG. 12-1, a first position 1201 of a first display 400 may proximity-touched with a pointer. Accordingly, a cursor 510 may displayed on the second display 500 in response to the proximity-touch, where the position of the cursor 510 corresponds to the location of the first position 1201.

Furthermore, the proximity-touched pointer may be dragged to a second position 1202 of the first display 400

(FIG. 12-2). Accordingly, the cursor 510 may move to a new location which corresponds to the second position 1202 of the first display 400.

Specifically, the cursor 510 moves on the second display 500 in relation to a proximity-touch and drag performed on the first display 400.

Figure 13:
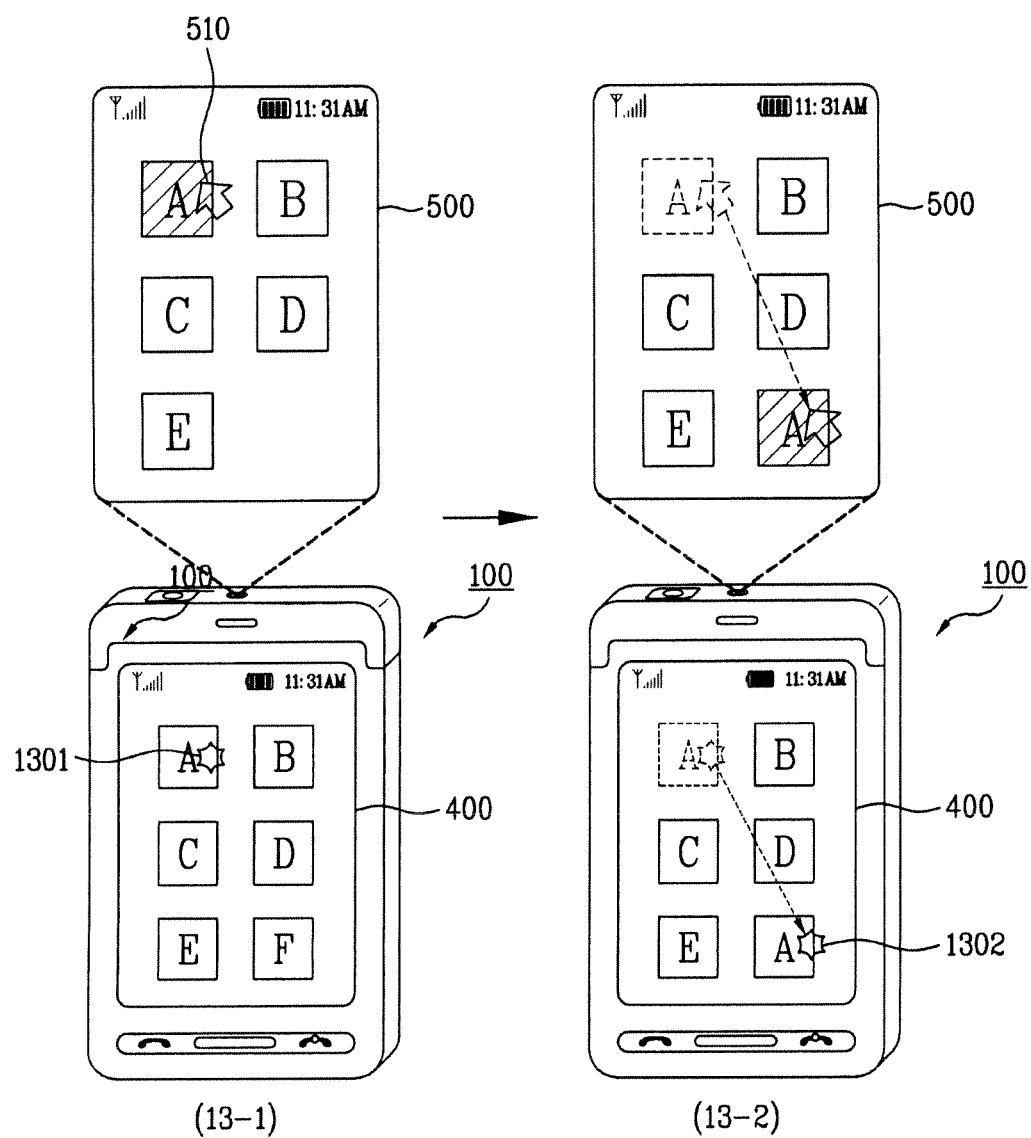

As illustrated in FIG. 13-1, a first position 1301 of a first display 400 is touched via an object. Additionally, a cursor 510 may be displayed on the second display 500 corresponding to the first position. Furthermore, an object "A" at the second position is selected in response to the touch on the first display 400.

FIG. 13-2 illustrates dragging the pointer from the first position 1301 of the first display 400 to a second position 1302. Accordingly, the cursor 510 may move to a new location on the second display 500 corresponding to the second position 1302, in response to the drag operation performed on the first display 400. Additionally, the object "A" may be shifted to the new location on the second display 500.

Specifically, the cursor 510 and the corresponding selected object may be moved on the second display 500 in response to a touch and drag performed on the first display 400.

In FIG. 12 and FIG. 13, only the cursor moves in response to a proximity-touch and drag on the touchscreen. Additionally, both the cursor and a corresponding object may be moved in response to a contact-touch and drag on the touchscreen.

For example, only the cursor may move in response to the contact-touch and drag on the touchscreen. Additionally, both the cursor and a corresponding object may be moved in response to a proximity-touch and drag on the touchscreen.

The process of distinguishing proximity-touch and a contact-touch of the pointer will be explained in more detail with references to FIGS. 14 and 15.

Figure 14:
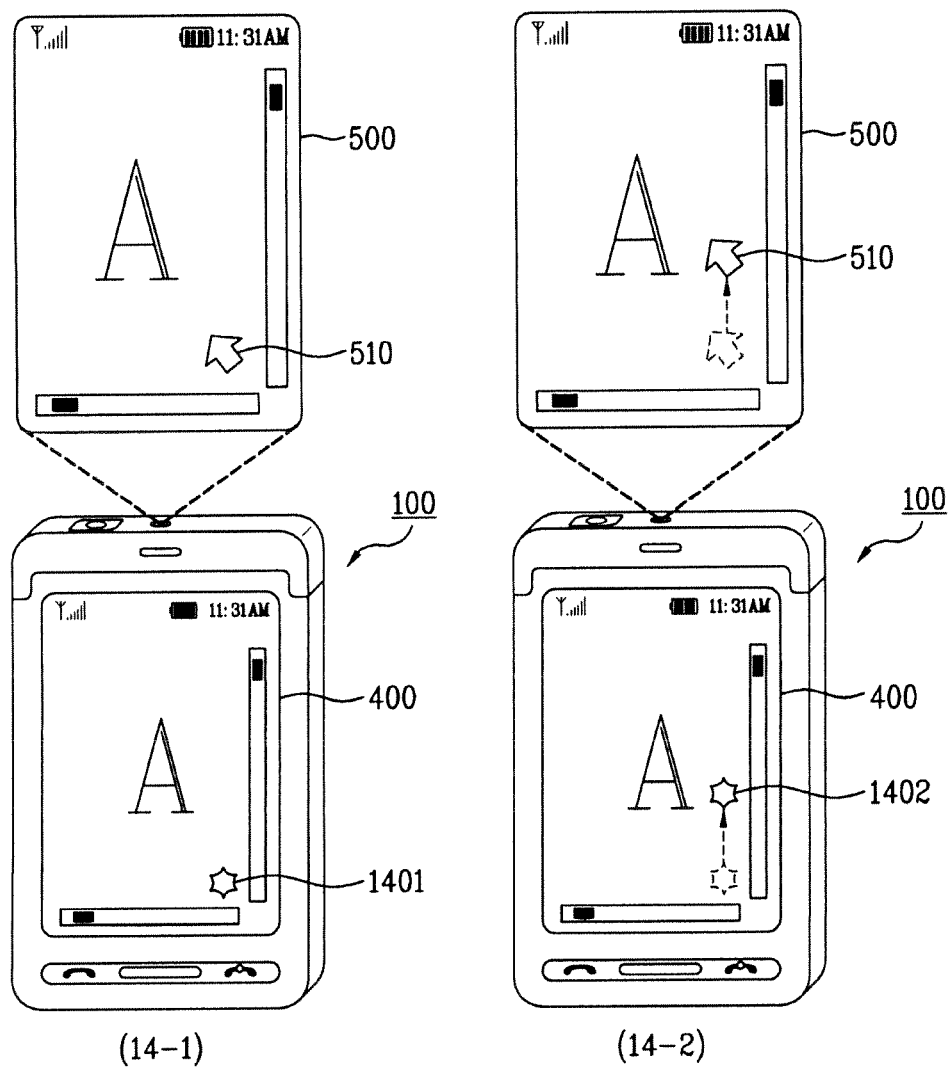

As illustrated in FIG. 14-1, a cursor 510 is displayed on the second display 500 in response to a proximity-touch on a first position 1401 of a first display 400. Furthermore, FIG. 14-2 illustrates that the cursor 510 may move on the second display 500 in response to dragging the pointer via a proximity-touch from the first position 1401 to a second position 1402 on the first display 400.

Specifically, only the cursor 510 is shifted on the second display 500 if the pointer is proximity-touched and dragged on the first display 400.

Figure 15:
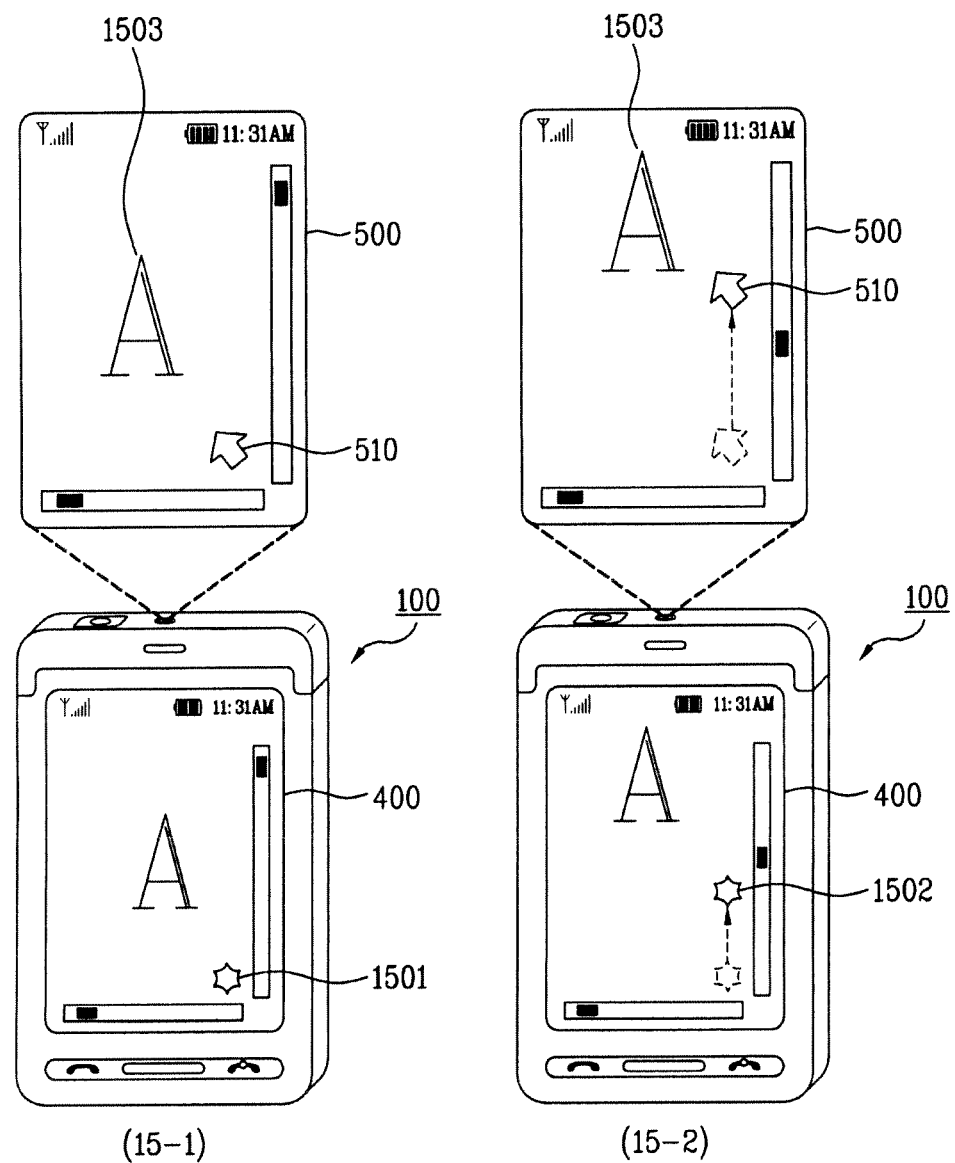

As illustrated in FIG. 15-1, the cursor 510 is displayed on the second display 500 in response to a contact-touch on the first display 400. Furthermore, the location of the cursor 510 on the second display 500 corresponds to the first location 1501 of the contact-touch on the first display 400. Additionally, as illustrated in FIG. 15-2, both the cursor 510 and the image 1503 move on the second display 500 in response to dragging the pointer via a contact touch on the first display 400 from a first location 1501 to a second location 1502.

Specifically, both the cursor 510 and the image 1503 displayed on the on the second display 500 move in response to the contact-touch and drag performed on the first display 400.

The process of displaying the cursor in response to a touch is explained with reference to FIG. 16. As illustrated in FIG. 16-1, the mobile terminal 100 stops displaying the cursor 510 when a pointer is released from being touched on a first position 1601 of the first display 400.

As illustrated in FIG. 16-2, the cursor 510 may be re-displayed if a second position 1602 of the first display 400 is touched. Additionally, as illustrated in FIG. 16-3, the cursor 510 is moved position on the second display 500 corresponding to the second position 1602, if the touch on the second position 1602 is maintained for a predetermined time period.

It is further noted that, according to an embodiment of the present invention, various functions associated with a mobile terminal may be accessed via a first display on a display unit and a second display projected by a projector unit. Accordingly, a user may utilize a terminal via various displays.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations, such as transmission via the Internet. Furthermore, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a touchscreen configured to display content comprising a rectangular-shaped image;
a projector configured to project at least a portion of the content onto a display surface which is externally located relative to the mobile terminal; and
a control unit configured to detect touch on the touchscreen, the detected touch on the touchscreen causing the projector to project a cursor onto the display surface along with the projected content,
cause the projector to project the projected content in a top-to-bottom direction such that two long sides of the rectangular-shaped image of the projected content are arranged in parallel with the top-to-bottom direction, when the rectangular-shaped image is a portrait-type image whose top side is located at a short side of the touchscreen, and
cause the projector to project the projected content in a left-to-right direction such that the two long sides of the rectangular-shaped image of the projected content are arranged in parallel with the left-to-right direction, when the rectangular-shaped image is a landscape-type image whose top side is located at a long side of the touchscreen.
2. The mobile terminal according to claim 1, wherein the cursor is movable over portions of the display surface responsive to the touch on the touchscreen.
3. The mobile terminal according to claim 1, further comprising:
a first sensor configured to detect a proximity-touch relative to the mobile terminal;
wherein the touchscreen is configured to detect a contact-touch relative to the mobile terminal;
wherein if the proximity touch is detected by the first sensor, the control unit is further configured to cause positioning of the cursor on the display surface in a manner that corresponds to a location at which the proximity touch is detected by the first sensor; and
wherein if the contact-touch is detected by the touchscreen, the control unit is further configured to control an object displayed on the touchscreen in a manner that corresponds to a location at which the contact-touch is detected by the touchscreen.

4. The mobile terminal according to claim 3, wherein
if the detected proximity touch comprises a dragging, the control unit is further configured to cause movement of the cursor that corresponds to a direction of the dragging of the detected proximity touch; and wherein
if the contact-touch comprises a dragging, the control unit is further configured to cause scrolling of the displayed content in a direction which corresponds to a direction of the dragging of the detected contact-touch.

5. The mobile terminal according to claim 3, wherein the first sensor comprises a proximity sensor.

6. The mobile terminal according to claim 1, further comprising:
a plurality of keys individually corresponding to one of a plurality of regions of the content that is projected onto the display surface; and
wherein the control unit is further configured to project the cursor within a particular one of the plurality of regions of the content responsive to user input to a corresponding one of the plurality of keys.

7. The mobile terminal according to claim 6, wherein the control unit is further configured to cause the projector to project a semi-transparent overlay onto the display surface, wherein the overlay generally corresponds to the plurality of regions of the content.

8. The mobile terminal according to claim 6, wherein the control unit is further configured to cause the projector to project the content to be visually divided into the plurality of regions onto the display surface.

9. The mobile terminal according to claim 1, wherein if no touch is detected for a threshold period of time, the control unit is further configured to cause the projector to terminate projecting the cursor onto the display surface.

10. The mobile terminal according to claim 9, wherein if further touch is detected after the threshold period of time, the control unit is further configured to cause the projector to again project the cursor onto the display surface at a location that generally corresponds to a location that the cursor was projected onto the display surface that was prior to the threshold period of time.

11. The mobile terminal according to claim 1, further comprising:
a navigation key comprising a plurality of directional keys, wherein the control unit is further configured to cause the projector to project the cursor onto the display surface at a location which generally corresponds to a direction of a selected one of the plurality of directional keys.

12. The mobile terminal according to claim 1, wherein the projected content except the cursor is displayed on the touchscreen.

13. The mobile terminal of claim 1, wherein the controller is further configured to change an direction of the projected content between the left-to-right direction and the top-to-bottom orientation based on a user input.

14. A method of controlling a mobile terminal, the method comprising:
displaying content on a touchscreen physically coupled to the mobile terminal, wherein the content comprises a rectangular-shaped image;
projecting at least a portion of the content onto a display surface which is externally located relative to the mobile terminal;
detecting a touch on the touchscreen;
projecting a cursor onto the display surface along with the projected content responsive to the detected touch on the touchscreen;
projecting the projected content in a top-to-bottom direction such that two long sides of the rectangular-shaped image of the projected content are arranged in parallel with the top-to-bottom direction, when the rectangular-shaped image is a portrait-type image whose top side is located at a short side of the touchscreen; and
projecting the projected content in a left-to-right direction such that the two long sides of the rectangular-shaped image of the projected content are arranged in parallel with the left-to-right direction, when the rectangular-shaped image is a landscape-type image whose top side is located at a long side of the touchscreen.

15. The method according to claim 14, further comprising:
projecting the cursor onto the display surface without displaying the cursor on the touchscreen of the mobile terminal.

16. The method according to claim 14, further comprising:
detecting either a proximity-touch relative to the mobile terminal or a contact-touch relative to the mobile terminal;
wherein if the proximity touch is detected, the method further comprises positioning the cursor on the display surface in a manner that corresponds to a location at which the proximity touch is detected by a first sensor; and
wherein if the contact-touch is detected, the method further comprises controlling an object displayed on the display in a manner that corresponds to a location at which the contact-touch is detected the touchscreen.

17. The method according to claim 16, wherein
if the detected proximity touch comprises a dragging, the method further comprises causing movement of the cursor that corresponds to a direction of the dragging of the detected proximity touch; and wherein
if the contact-touch comprises a dragging, the method further comprises causing scrolling of the touchscreen in a direction which corresponds to a direction of the dragging of the detected contact-touch.

18. The method according to claim 14, further comprising:
projecting a semi-transparent overlay onto the display surface, wherein the overlay generally corresponds to a plurality of regions of the content.

19. The method according to claim 14, wherein:
the content which is projected onto the display surface, is visually divided into a plurality of regions.

20. The method according to claim 14, further comprising:
moving the cursor over portions of the display surface responsive to the touch on the touchscreen.

* * * * *